United States Patent
Lauridsen et al.

(10) Patent No.: US 11,871,370 B2
(45) Date of Patent: Jan. 9, 2024

(54) TIMING ADVANCE SIGNALLING

(71) Applicant: NOKIA TECHNOLOGIES OY, Espoo (FI)

(72) Inventors: Mads Lauridsen, Gistrup (DK); Jeroen Wigard, Klarup (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/217,168

(22) Filed: Mar. 30, 2021

(65) Prior Publication Data

US 2021/0314894 A1 Oct. 7, 2021

(30) Foreign Application Priority Data

Apr. 2, 2020 (WO) ................. PCT/EP2020/059404

(51) Int. Cl.
  *H04W 56/00* (2009.01)
  *H04W 84/06* (2009.01)

(52) U.S. Cl.
  CPC ... *H04W 56/0045* (2013.01); *H04W 56/0005* (2013.01); *H04W 84/06* (2013.01)

(58) Field of Classification Search
  CPC .............................................. H04W 88/00–06
  See application file for complete search history.

(56) References Cited

U.S. PATENT DOCUMENTS

| | | | |
|---|---|---|---|
| 10,554,293 B1* | 2/2020 | Chin | H04W 74/006 |
| 2011/0200032 A1* | 8/2011 | Lindstrom | H04W 56/0005 370/350 |
| 2013/0201910 A1* | 8/2013 | Bergstrom | H04L 5/001 370/328 |
| 2014/0044074 A1* | 2/2014 | Chen | H04W 74/0833 370/329 |

(Continued)

FOREIGN PATENT DOCUMENTS

| | | |
|---|---|---|
| EP | 1 249 082 A1 | 10/2002 |
| WO | WO 01/054315 A1 | 7/2001 |
| WO | WO 2020/034574 A1 | 2/2020 |

OTHER PUBLICATIONS

International Search Report & Written Opinion dated Jan. 12, 2021 corresponding to International Patent Application No. PCT/EP2020/059404.

(Continued)

*Primary Examiner* — San Htun
(74) *Attorney, Agent, or Firm* — SQUIRE PATTON BOGGS (US) LLP

(57) ABSTRACT

A client device, a network node device, methods and computer programs are disclosed. A client device may comprise at least one processor and at least one memory including computer program code. The at least one memory and the computer program code may be configured to, with the at least one processor, cause the client device to receive a timing advance configuration message from a network node device, wherein the timing advance configuration message (Continued)

comprises a plurality of timing advance commands; perform a plurality of consecutive uplink transmissions to the network node device; and apply the plurality of timing advance commands between the plurality of consecutive uplink transmissions.

12 Claims, 5 Drawing Sheets

(56) References Cited

U.S. PATENT DOCUMENTS

| | | | | |
|---|---|---|---|---|
| 2014/0086161 | A1* | 3/2014 | Cai | H04W 72/042 |
| | | | | 370/329 |
| 2015/0003430 | A1* | 1/2015 | Hole | H04W 74/0866 |
| | | | | 370/336 |
| 2015/0124787 | A1* | 5/2015 | Dinan | H04W 56/0005 |
| | | | | 370/336 |
| 2017/0273079 | A1* | 9/2017 | Park | H04L 27/26025 |
| 2017/0288845 | A1* | 10/2017 | Axmon | H04W 56/0045 |
| 2018/0160440 | A1* | 6/2018 | Hosseini | H04L 5/001 |
| 2019/0313357 | A1* | 10/2019 | Wang | H04W 56/0045 |

OTHER PUBLICATIONS

3GPP TR 38.821 V1.0.0 (Dec. 2019), Technical Report, 3rd Generation Partnership Project; Technical Specification Group Radio Access Network; Solutions for NR to support non-terrestrial networks (NTN) (Release 16), Dec. 2, 2019, XP051840691.
Indian Examination Report corresponding to IN Application No. 202247055584, dated Dec. 13, 2022.

* cited by examiner

TIMING ADVANCE SIGNALLING

CROSS REFERENCE TO RELATED APPLICATION

This application claims priority from International Patent Application No. PCT/EP2020/059404 filed on Apr. 2, 2020. The contents of this application is hereby incorporated by reference.

TECHNICAL FIELD

The present application generally relates to the field of wireless communications. In particular, the present application relates to a client device and a network node device for wireless communication, and related methods and computer programs.

BACKGROUND

Timing advance may be used to compensate for propagation delay in transmission between two devices, such as a client device and a network node device. When the propagation delay changes rapidly due to, for example, movement of one of the devices, it may be beneficial to update the used timing advance more frequently. However, such signalling may also introduce additional overhead and/or increase power consumption of the devices. This may be especially detrimental with low-power application, such as internet of things (IoT).

SUMMARY

An embodiment of a client device comprises at least one processor and at least one memory including computer program code. The at least one memory and the computer program code are configured to, with the at least one processor, cause the client device to: receive a timing advance configuration message from a network node device, wherein the timing advance configuration message comprises a plurality of timing advance commands; perform a plurality of consecutive uplink transmissions to the network node device; and apply the plurality of timing advance commands between the plurality of consecutive uplink transmissions. The client device may, for example, compensate for timing drift during the plurality of consecutive uplink transmissions.

An embodiment of a client device comprises means for performing: receive a timing advance configuration message from a network node device, wherein the timing advance configuration message comprises a plurality of timing advance commands; perform a plurality of consecutive uplink transmissions to the network node device; and apply the plurality of timing advance commands between the plurality of consecutive uplink transmissions.

In an embodiment, alternatively or in addition to the above-described embodiments, the timing advance configuration message further comprises an indication of validity times for the plurality of timing advance commands, and the at least one memory and the computer program code are further configured to, with the at least one processor, cause the client device to: apply the plurality of timing advance commands according to the indication of the validity times. The client device may, for example, apply the timing advance commands appropriately to compensate for timing drift.

In an embodiment, alternatively or in addition to the above-described embodiments, the indication of the validity times comprises at least one of: a plurality of validity times corresponding to the plurality of timing advance commands; or a periodicity value indicating a time periodicity for applying a new timing advance command from the plurality of timing advance commands. The client device may, for example, efficiently receive the indication of the validity times.

In an embodiment, alternatively or in addition to the above-described embodiments, the at least one memory and the computer program code are further configured to, with the at least one processor, cause the client device to: before receiving the timing advance configuration message, transmit a request for the uplink transmissions to the network node device. The client device may, for example, indicate to the network node device the need for the uplink transmissions.

In an embodiment, alternatively or in addition to the above-described embodiments, the plurality of consecutive uplink transmissions corresponds to transmission repetitions. The client device may, for example, compensate for timing drift during transmission repetitions.

In an embodiment, alternatively or in addition to the above-described embodiments, the at least one memory and the computer program code are further configured to, with the at least one processor, cause the client device to: perform the uplink transmissions using narrowband physical uplink shared channel. The client device may, for example, perform the uplink transmissions with improved compatibility.

In an embodiment, alternatively or in addition to the above-described embodiments, the at least one memory and the computer program code are further configured to, with the at least one processor, cause the client device to: receive the timing advance configuration message using narrowband physical downlink control channel. The client device may, for example, receive the timing advance configuration message with improved compatibility.

In an embodiment, alternatively or in addition to the above-described embodiments, the client device and the network node device are part of a non-terrestrial network. The client device may, for example, compensate for timing drift in a non-terrestrial network.

An embodiment of a network node device comprises at least one processor and at least one memory including computer program code. The at least one memory and the computer program code are configured to, with the at least one processor, cause the network node device to: estimate a timing drift of a client device; determine a plurality of timing advance commands for the client device based on the estimated timing drift; and transmit a timing advance configuration message comprising the plurality of timing advance commands to the client device. The network node device may, for example, An embodiment of a network node device comprises means for performing: estimate a timing drift of a client device; determine a plurality of timing advance commands for the client device based on the estimated timing drift; and transmit a timing advance configuration message comprising the plurality of timing advance commands to the client device.

In an embodiment, alternatively or in addition to the above-described embodiments, the at least one memory and the computer program code are further configured to, with the at least one processor, cause the network node device to: determine an indication of validity times based on the estimated timing drift, wherein the indication of validity times corresponds to the plurality of timing advance commands, and wherein the timing advance configuration message further comprises the indication of validity times. The network node device may, for example, determine appropriate timing for applying the TA commands and signal this information to the client device.

In an embodiment, alternatively or in addition to the above-described embodiments, the indication of the validity times comprises at least one of: a plurality of validity times corresponding to the plurality of timing advance commands; or a periodicity value indicating a time periodicity for applying a new timing advance command from the plurality of timing advance commands. The network node device may, for example, efficiently signal the appropriate timing for applying the TA commands to the client device.

In an embodiment, alternatively or in addition to the above-described embodiments, the at least one memory and the computer program code are further configured to, with the at least one processor, cause the network node device to: determine the plurality of timing advance commands for the client device and/or the indication of validity times in response to receiving a request for an uplink transmission from the client device. The network node device may, for example, determine the TA commands when the client device need to perform uplink transmission.

In an embodiment, alternatively or in addition to the above-described embodiments, the at least one memory and the computer program code are further configured to, with the at least one processor, cause the network node device to: determine scheduling parameters for the client device; determine an expected uplink transmission time based on the scheduling parameters; and determine the plurality of timing advance commands and/or the indication of the validity times based on the expected uplink transmission time. The network node device may, for example, efficiently determine appropriate TA commands.

In an embodiment, alternatively or in addition to the above-described embodiments, the at least one memory and the computer program code are further configured to, with the at least one processor, cause the network node device to: determine the plurality of timing advance commands and the indication of validity times based at least on a relative location of the network node device and/or a satellite corresponding to the network node device and the client device and/or a relative motion of the network node device and/or a satellite corresponding to the network node device and the client device. The network node device may, for example, efficiently determine appropriate TA commands.

In an embodiment, alternatively or in addition to the above-described embodiments, the at least one memory and the computer program code are further configured to, with the at least one processor, cause the network node device to: transmit the timing advance configuration message using narrowband physical downlink control channel. The network node device may, for example, transmit the TA configuration message with improve compatibility.

In an embodiment, alternatively or in addition to the above-described embodiments, the at least one memory and the computer program code are further configured to, with the at least one processor, cause the network node device to: determine a number of transmission repetitions for the uplink transmissions; and transmit an indication of the number of transmission repetitions to the client device. The network node device may, for example, efficiently signal to the client device the configuration for the uplink transmission.

In an embodiment, alternatively or in addition to the above-described embodiments, the network node device is part of a non-terrestrial network. The network node device may, for example, enable the client device to compensate for timing drift in an NTN scenario.

An embodiment of a method comprises: receiving a timing advance configuration message from a network node device, wherein the timing advance configuration message comprises a plurality of timing advance commands; performing a plurality of consecutive uplink transmissions to the network node device; and applying the plurality of timing advance commands between the plurality of consecutive uplink transmissions.

In an embodiment, alternatively or in addition to the above-described embodiments, the timing advance configuration message further comprises an indication of validity times for the plurality of timing advance commands, and the method further comprises applying the plurality of timing advance commands according to the indication of the validity times.

In an embodiment, alternatively or in addition to the above-described embodiments, the indication of the validity times comprises at least one of: a plurality of validity times corresponding to the plurality of timing advance commands; or a periodicity value indicating a time periodicity for applying a new timing advance command from the plurality of timing advance commands.

In an embodiment, alternatively or in addition to the above-described embodiments, the method further comprises before receiving the timing advance configuration message, transmitting a request for the uplink transmissions to the network node device.

In an embodiment, alternatively or in addition to the above-described embodiments, the plurality of consecutive uplink transmissions corresponds to transmission repetitions.

In an embodiment, alternatively or in addition to the above-described embodiments, the method further comprises performing the uplink transmission using narrowband physical uplink shared channel.

In an embodiment, alternatively or in addition to the above-described embodiments, the method further comprises receiving the timing advance configuration message using narrowband physical downlink control channel.

In an embodiment, alternatively or in addition to the above-described embodiments, the method is performed by a client device and wherein the client device and the network node device are part of a non-terrestrial network.

An embodiment of a computer program product comprises program code configured to perform the method according to any of the above client device related embodiments, when the computer program product is executed on a computer.

An embodiment of a method comprises: estimating a timing drift of a client device; determining a plurality of timing advance commands for the client device based on the estimated timing drift; and transmitting a timing advance configuration message comprising the plurality of timing advance commands to the client device.

In an embodiment, alternatively or in addition to the above-described embodiments, method further comprises determining an indication of validity times based on the estimated timing drift, wherein the indication of validity times corresponds to the plurality of timing advance commands, and wherein the timing advance configuration message further comprises the indication of validity times.

In an embodiment, alternatively or in addition to the above-described embodiments, the indication of the validity times comprises at least one of: a plurality of validity times corresponding to the plurality of timing advance commands; or a periodicity value indicating a time periodicity for applying a new timing advance command from the plurality of timing advance commands.

In an embodiment, alternatively or in addition to the above-described embodiments, the method further comprises determining the plurality of timing advance commands for the client device and/or the indication of validity times in response to receiving a request for an uplink transmission from the client device.

In an embodiment, alternatively or in addition to the above-described embodiments, the method further comprises: determining scheduling parameters for the client device; determining an expected uplink transmission time based on the scheduling parameters; and determining the plurality of timing advance commands and/or the indication of the validity times based on the expected uplink transmission time.

In an embodiment, alternatively or in addition to the above-described embodiments, the method further comprises: determining the plurality of timing advance commands and the indication of validity times based at least on a relative location of the network node device and/or a satellite corresponding to the network node device and the client device and/or a relative motion of the network node device and/or a satellite corresponding to the network node device and the client device.

In an embodiment, alternatively or in addition to the above-described embodiments, the method further comprises transmitting the timing advance configuration message using narrowband physical downlink control channel.

In an embodiment, alternatively or in addition to the above-described embodiments, the method further comprises: determining a number of transmission repetitions for the uplink transmissions; and transmitting an indication of the number of transmission repetitions to the client device.

In an embodiment, alternatively or in addition to the above-described embodiments, the method is performed by a network node device, and wherein the network node device is part of a non-terrestrial network.

An embodiment of a computer program product comprises program code configured to perform the method according to any of the above network node device related embodiments, when the computer program product is executed on a computer.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings:

FIG. 3 shows a comparative example of the subject matter described herein illustrating a diagram of transmission repetitions;

FIG. 4 shows an example embodiment of the subject matter described herein illustrating a diagram of transmission repetitions with TA compensation;

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
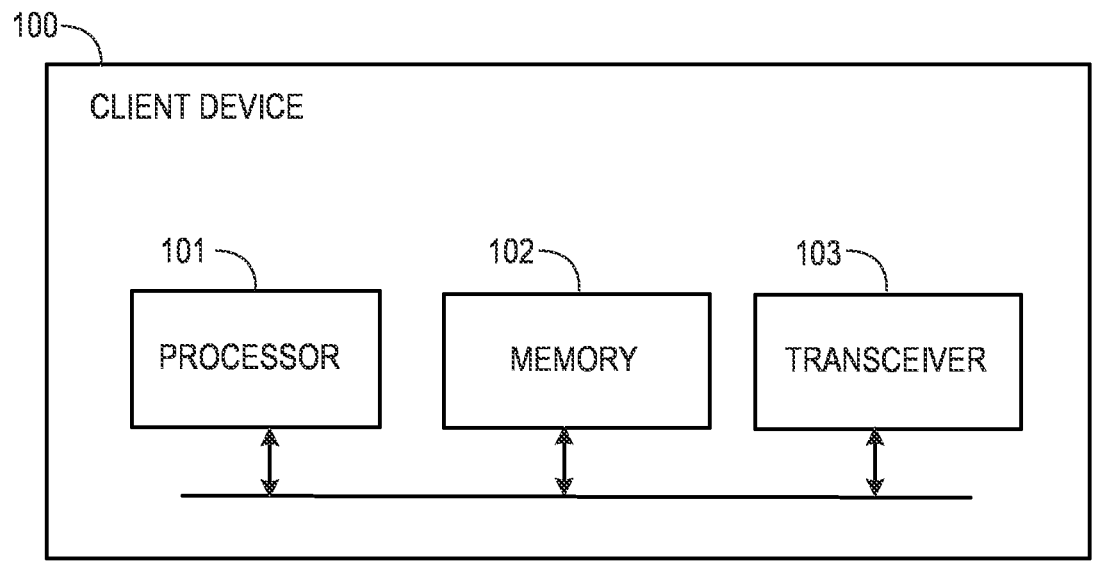
FIG. 1 shows an example embodiment of the subject matter described herein illustrating a client device.

FIG. 1 is a block diagram of a client device 100, in accordance with an example embodiment.

The client device 100 comprises one or more processors 101, and one or more memories 102 that comprise computer program code. The client device 100 may also include a transceiver 103, as well as other elements, such as an input/output module (not shown in FIG. 1), and/or a communication interface (not shown in FIG. 1).

According to an example embodiment, the at least one memory 102 and the computer program code are configured to, with the at least one processor 101, cause the client device 100 to receive a timing advance (TA) configuration message from a network node device. The TA configuration message may comprise a plurality of TA commands.

The client device 100 may receive the TA configuration message using, for example, the transceiver 103.

The plurality of TA commands may also be referred to as a set of TA commands, a bundle of TA commands, or similar. A TA command may also be referred to as a TA, a TA value, or similar.

The client device 100 may receive the TA configuration message as a part of another message or as a separate message. For example, the client device 100 may receive the TA configuration message as a part of a scheduling message for an uplink transmission. Such a scheduling message may indicate, for example, modulation and coding scheme for the uplink transmission, resources allocated for the uplink transmission, and/or number of transmission repetitions for the uplink transmission.

The client device 100 may receive the TA configuration message using, for example, narrowband physical downlink control channel (NPDCH).

The client device 100 may perform a plurality of consecutive uplink transmissions to the network node device. The client device 100 may apply the plurality of TA commands between the plurality of consecutive uplink transmissions. The timing advance configuration message may further comprise an indication of validity times for the plurality of timing advance commands. The client device 100 may apply the plurality of timing advance commands according to the indication of the validity times.

The indication of the validity times may comprise a plurality of validity times corresponding to the plurality of timing advance commands. Each validity time in the plurality of validity times may correspond to a TA command in the plurality of TA commands. The plurality of validity times may indicate to the client device 100 at what time the client device 100 should use each TA command in the plurality of TA commands. Alternatively, each validity time in the plurality of validity times may indicate a time window during which a corresponding TA command in the plurality of TA commands is valid.

Alternatively or additionally, the indication of the validity times may comprise a periodicity value indicating a time periodicity for applying a new timing advance command from the plurality of timing advance commands. The periodicity value may be expressed with respect to, for example, time, measurement gaps, or transmission repetitions. For example, the periodicity value may indicate that the client device 100 should apply a new TA command every other second, every other transmission gap, or every other transmission repetition.

Alternatively, the network node device may not transmit the indication of the validity times to the client device 100. Instead, the client device 100 may be, for example, preconfigured to apply a new TA command from the plurality of TA commands with a preconfigured periodicity.

The plurality of consecutive uplink transmissions may correspond to, for example, transmission repetitions. Alternatively or additionally, the plurality of consecutive uplink transmissions may correspond to the transmission of some large amount of data that has been split into the plurality of uplink transmissions.

The plurality of TA commands in the TA configuration message may, for example, comprise a TA command for each transmission repetition. Further, the indication of validity times may indicate that the client device 100 should apply a new TA command at the start of each transmission repetition, at the end of each transmission gap, at the end of every other transmission gap etc. Alternatively, the client device 100 may use the plurality of TA commands in some other fashion as indicated by the indication of the validity times.

The client device 100 may, for example, before receiving the timing advance configuration message, transmit a request for the uplink transmissions to the network node device.

The network node device may respond to the request for uplink transmission by scheduling the uplink transmission and by transmitting the timing advance configuration message to the client device 100.

The client device 100 and the network node device may be part of a non-terrestrial network (NTN). The client device 100 may operate, for example, in an NTN and the network node device may comprise a satellite of the non-terrestrial network or the network node device may be located on Earth and a satellite may amplify and forward signals from/to the network node device.

The client device 100 may comprise, for example, an internet of things (IoT) device, such as a narrow-band IoT (NB-IoT) device, or an enhanced machine-type communication (eMTC) device. The network node device may function as a base station, such as a gNB, comprised in the satellite.

The client device 100 may perform the uplink transmissions using, for example, narrowband physical uplink shared channel (NPUSCH).

Although the client device 100 is depicted to include only one processor 101, the client device 100 may include more processors. In an embodiment, the memory 102 is capable of storing instructions, such as an operating system and/or various applications.

Furthermore, the processor 101 is capable of executing the stored instructions. In an embodiment, the processor 101 may be embodied as a multi-core processor, a single core processor, or a combination of one or more multi-core processors and one or more single core processors. For example, the processor 101 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 101 may be configured to execute hard-coded functionality. In an embodiment, the processor 101 is embodied as an executor of software instructions, wherein the instructions may specifically configure the processor 101 to perform the algorithms and/or operations described herein when the instructions are executed.

The memory 102 may be embodied as one or more volatile memory devices, one or more non-volatile memory devices, and/or a combination of one or more volatile memory devices and non-volatile memory devices. For example, the memory 102 may be embodied as semiconductor memories (such as mask ROM, PROM (programmable ROM), EPROM (erasable PROM), flash ROM, RAM (random access memory), etc.).

The client device 100 may be any of various types of devices used directly by an end user entity and capable of communication in a wireless network, such as user equipment (UE). Such devices include but are not limited to smartphones, tablet computers, smart watches, lap top computers, internet of things (IoT) devices, narrow-band internet of things (NB-IoT) devices, enhanced machine-type communication devices etc.

Figure 2:
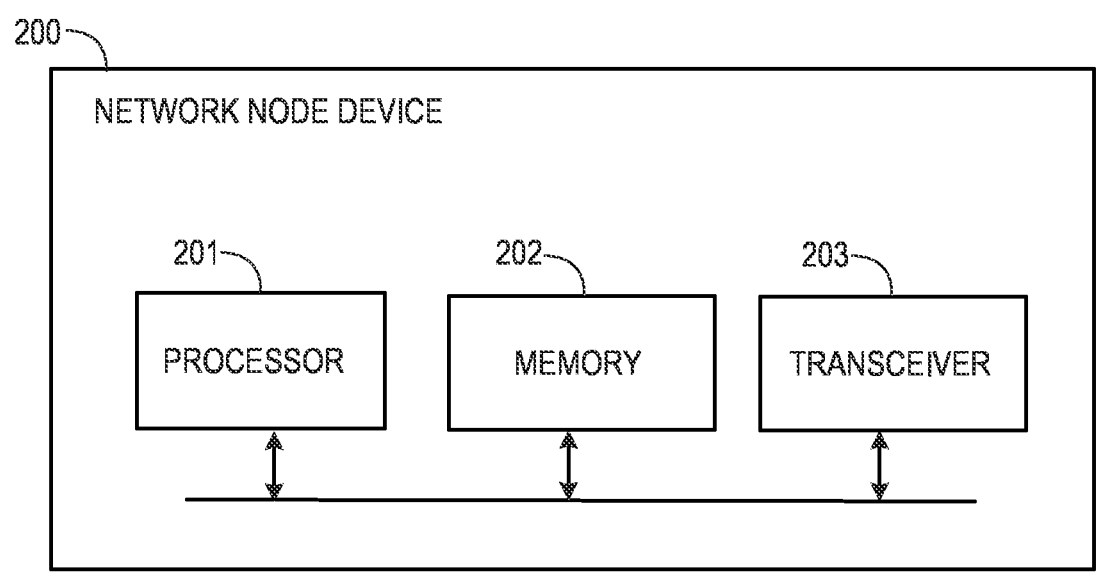
FIG. 2 shows an example embodiment of the subject matter described herein illustrating a network node device.

FIG. 2 is a block diagram of a network node device 200, in accordance with an example embodiment.

The network node device 200 comprises one or more processors 201, and one or more memories 202 that comprise computer program code. The network node device 200 may also include a transceiver 203, as well as other elements, such as an input/output module (not shown in FIG. 2B), and/or a communication interface (not shown in FIG. 2B).

According to an example embodiment, the at least one memory 202 and the computer program code configured to, with the at least one processor 201, cause the network node device 200 to estimate a timing drift of a client device 100.

The network node device 200 may, for example, estimate the timing drift that occurs during a plurality of consecutive uplink transmissions.

The network node device 200 may determine a plurality of timing advance commands for the client device 100 based on the estimated timing drift. The plurality of TA commands may compensate for the timing drift.

The network node device 200 may transmit a timing advance configuration message comprising the plurality of timing advance commands to the client device 100.

The network node device 200 may determine an indication of validity times based on the estimated timing drift, wherein the indication of validity times corresponds to the plurality of timing advance commands, and wherein the timing advance configuration message further comprises the indication of validity times.

The validity times may comprise at least one of: a plurality of validity times corresponding to the plurality of timing advance commands or a periodicity value indicating a time periodicity for applying a new timing advance command from the plurality of timing advance commands. Thus, the indication of validity times may comprise, for example, an explicit list of validity times or the indication of validity times may indicate a periodicity at which the TA command should be changed.

The plurality of TA commands may comprise a TA command for each transmission repetition of an uplink transmission. Further, the plurality of validity times may indicate that the client device 100 should use a new TA command at the start of each transmission repetition. Alternatively, plurality of validity times may indicate that the client device 100 should use the plurality of TA commands in some other fashion.

The network node device 200 may transmit the TA configuration message as a part of another message or as a separate message. For example, the network node device 200 may transmit the TA configuration message as a part of a scheduling message for an uplink transmission. Such a scheduling message may indicate, for example, modulation and coding scheme for the uplink transmission, resources allocated for the uplink transmission, and/or number of transmission repetitions for the uplink transmission.

The network node device 200 may receive an uplink transmission from the client device 100. The client device 100 may use the plurality of TA commands for transmission repetitions during the uplink transmission.

The network node device 200 may transmit the TA configuration message using, for example, narrowband physical downlink control channel.

The network node device 200 may, for example, determine a plurality of timing advance commands for the client device 100 and/or the indication of validity times in response to receiving a request for an uplink transmission from the client device 100.

The network node device 200 may, for example, determine scheduling parameters for the client device. The network node device 200 may determine an expected uplink transmission time based on the scheduling parameters.

The network node device 200 may determine the plurality of timing advance commands and/or the indication of the validity times based on the expected uplink transmission time. The network node device 200 may, for example, the timing drift of the client device 200 based on the duration of the uplink transmission. Thus, the network node device 200 may deduce appropriate TA commands and/or the indication of the validity times in order to compensate for the timing drift.

The network node device 200 may, for example, calculate scheduling parameters for the uplink transmission and transmit message indicating the scheduling parameters and the TA configuration message to the client device 100 in a single message or in separate messages.

The network node device 200 may, for example, determine the plurality of timing advance commands and the indication of validity times based at least on a relative location of the network node device 200 and/or a satellite corresponding to the network node device 200 and the client device 100 and/or a relative motion of the network node device 200 and/or a satellite corresponding to the network node device 200 and the client device 100.

The network node device 200 and/or the client device 100 may comprise, for example, global navigation satellite system (GNSS) capability. Thus, the network node device 200 may be aware of the location and/or motion of the client device 100. Thus, the network node device 200 may predict the appropriate TA commands during the uplink transmission. Alternatively or additionally, the network node device 200 may utilise other information about the location/motion of the network node device 200 and/or of the client device 100. For example, if the network node device 200 corresponds to a satellite in an NTN, the network node device 200 may use ephemeris of the network node device 200.

The network node device 200 may determine a number of transmission repetitions for the uplink transmissions and transmit an indication of the number of transmission repetitions to the client device.

According to an example embodiment, the network node device 200 comprises a satellite of a non-terrestrial network.

Although the network node device 200 is depicted to include only one processor 201, the network node device 200 may include more processors. In an embodiment, the memory 202 is capable of storing instructions, such as an operating system and/or various applications. Furthermore, the memory 202 may include a storage that may be used e.g. to store at least some of the timing advance compensation function curves used the disclosed embodiments.

Furthermore, the processor 201 is capable of executing the stored instructions. In an embodiment, the processor 201 may be embodied as a multi-core processor, a single core processor, or a combination of one or more multi-core processors and one or more single core processors. For example, the processor 201 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 201 may be configured to execute hard-coded functionality. In an embodiment, the processor 201 is embodied as an executor of software instructions, wherein the instructions may specifically configure the processor 201 to perform the algorithms and/or operations described herein when the instructions are executed.

The memory 202 may be embodied as one or more volatile memory devices, one or more non-volatile memory devices, and/or a combination of one or more volatile memory devices and non-volatile memory devices. For example, the memory 202 may be embodied as semiconductor memories (such as mask ROM, PROM (programmable ROM), EPROM (erasable PROM), flash ROM, RAM (random access memory), etc.).

The network node device 200 may be a base station. The base station may include e.g. a fifth-generation base station (gNB) or any such device suitable for implementation in a satellite and providing an air interface for client devices to connect to the wireless network via wireless transmissions.

Figures 3, 4:
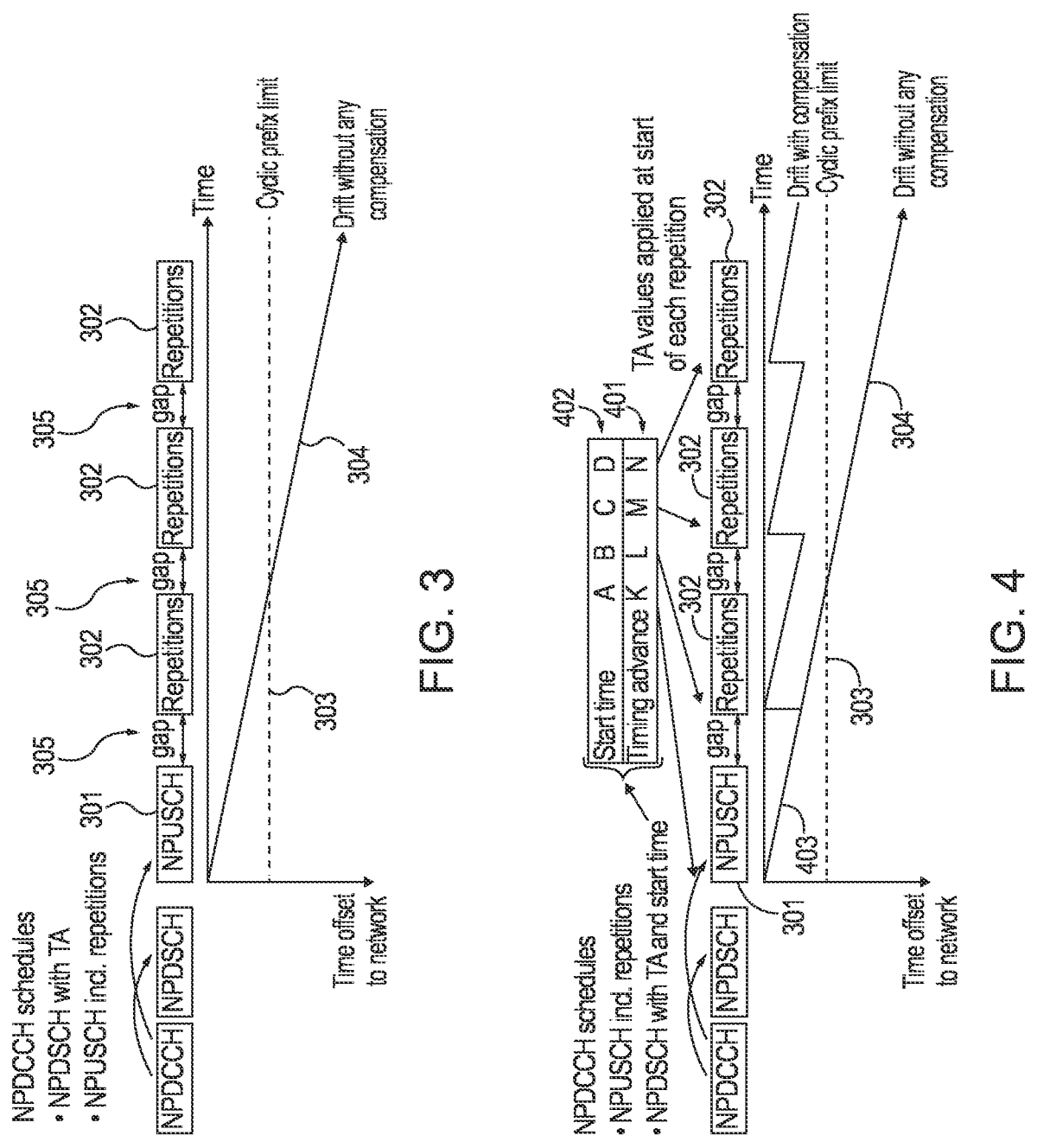

FIG. 3 shows a comparative example of the subject matter described herein illustrating a diagram of transmission repetitions.

Narrow-band internet of things (NB-IoT) and enhanced Machine-Type Communication (eMTC) have been designed for low-power wide-area terrestrial networks with targets of long range (20 dB better than GSM) and low device power consumption (up to 10 years battery lifetime). It may be desirable to achieve long-range communication in NB-IoT and/or eMTC for application in, for example, non-terrestrial networks (NTN).

Some example embodiments herein may refer to NB-IoT. However, any example embodiment may also be applied to eMTC.

One procedure for achieving long range transmission is repetitions of the encoded payload to ensure sufficient energy is obtained in the receiver. For example, the Narrowband Physical Uplink Shared Channel (NPUSCH) may be repeated in N consecutive slots. N may defined as $$N = N_{rep} \times N_{RU} \times N_{slots}^{UL},$$

where $N_{rep}$ is the repetition number, indicated in the scheduling downlink control information (DCI), $N_{RU}$ is the resource assignment field indicated in the scheduling DCI, and $N_{slots}^{UL}$ is the number of uplink slots of the resource unit.

The number of repetitions may be, for example, 1-128, while the number of resource units may be, for example, 1-10. For frame structure type 1 (FDD) the subcarrier spacing may be 3.75 kHz or 15 kHz, which corresponds to slot lengths of 2 ms and 0.5 ms, respectively. Independently of the subcarrier spacing the maximum number of uplink slots may be, for example, 16. Thus, the maximum transmission time may be $$t_{15\ kHz} = 0.5\ \text{ms} \times 128 \times 10 \times 16 = 10240\ \text{ms}$$

$$t_{3.75\ kHz} = 2\ \text{ms} \times 128 \times 10 \times 16 = 40960\ \text{ms}$$

Such long transmission times may be challenging for NTN operation, because certain radio parameters, such as TA, change over time, since Low-Earth Orbit (LEO) satellites move fast relative to the Earth. For example, the variation of round-trip delay may be +/−20 μs/s for regenerative LEO at 600 km altitude. Thus, within one 10-40 s transmission, the potential time shift may be 200-800 μs, which may significantly exceed the cyclic prefix of approximately 5-8 μs (varies with subcarrier spacing and symbol number).

The impact of the long transmission times may be partially addressed by the introduction of transmission gaps. For example, a 40 ms gap may be inserted after 256 ms of NPUSCH transmission. The gap, in principle, may allow the client device 100 to read the primary and secondary synchronization signals. However, a client device 100 may not be allowed to adjust its transmission timing during repetitions, nor shall it apply timing advance commands. These gaps may furthermore increase the length of a transmission even further (approximately 15%).

In NTN applications, since satellites may move approximately at a speed of 7.5 km/s relative to the Earth, the potential movement of the client device 100 on the Earth may have a limited impact on the drift of the TA compared to the movement of the satellite.

For the Narrowband Physical Random Access Channel (NPRACH) the client device 100 may also apply repetitions, but the resulting repetition times may be shorter, being in the order of 700-2500 ms. Furthermore, the cyclic prefix may be much longer and thus the impact of time shifting during repeated transmissions may be less of an issue.

The example embodiments disclosed herein relate to uplink transmit timing for NB-IoT and/or eMTC devices. The example embodiments herein may resolve some issues in non-terrestrial communication or other communication scenarios with large propagation delays and/or timing variations.

The client device 100 may perform an NPUSCH uplink transmission 301 with repetitions 302. The uplink transmission may be scheduled by the network node device 200 using narrowband physical downlink control channel (NPDCCH). The network node device 200 may also schedule the plurality of TA commands using NPDCCH. The client device 100 may use transmission gaps 305 between the repetitions 302. Since the client device 100 is applying the TA received before the uplink transmission 301, the time drift 304 exceeds the cyclic prefix limit 303 after a number of transmission repetitions 302. Thus, the transmission repetitions 302 may not align in time with resources allocated for reception in the receiving end reducing the likelihood that the data is decoded correctly and increasing the uplink interference in the receiver.

FIG. 4 shows an example embodiment of the subject matter described herein illustrating a diagram of transmission repetitions with TA compensation.

The network node device 200 may provide the client device 100 with a plurality of TA commands 401. The network node device 200 may further provide the client device 100 with a corresponding indication of validity time 402. The validity times 402 may indicate time instances at which each of the TA commands in the plurality of TA commands 401 becomes valid. The network node device 200 may provide the TA commands 401 and/or the validity times 402 before the start of an uplink transmission that is known to be repeated multiple times. This may replace the signalling of a single TA command before the start of the uplink transmission.

The network node device 200 may precompute the appropriate TA command for a specific point in the near future. The network node device 200 may use, for example, the location of the client device 100 for computing the TA commands 401. For example, in NTNs, the network node device 200 may utilise the predictability of satellite movement for precomputing the TA commands 401.

Furthermore, the network node device 200 may define when the client device 100 uplink transmission starts and the number of resource units and/or transmission repetitions used for the transmission. Therefore, the network node device 200 may determine at which points in time there is a need for an updated TA command.

As is illustrated in the example embodiment of FIG. 4, since the client device 100 applies a new TA command for each repetition 302, the TA drift 403 does not exceed the cyclic prefix limit 303 in contrast to the comparative example of FIG. 3.

Figure 5:
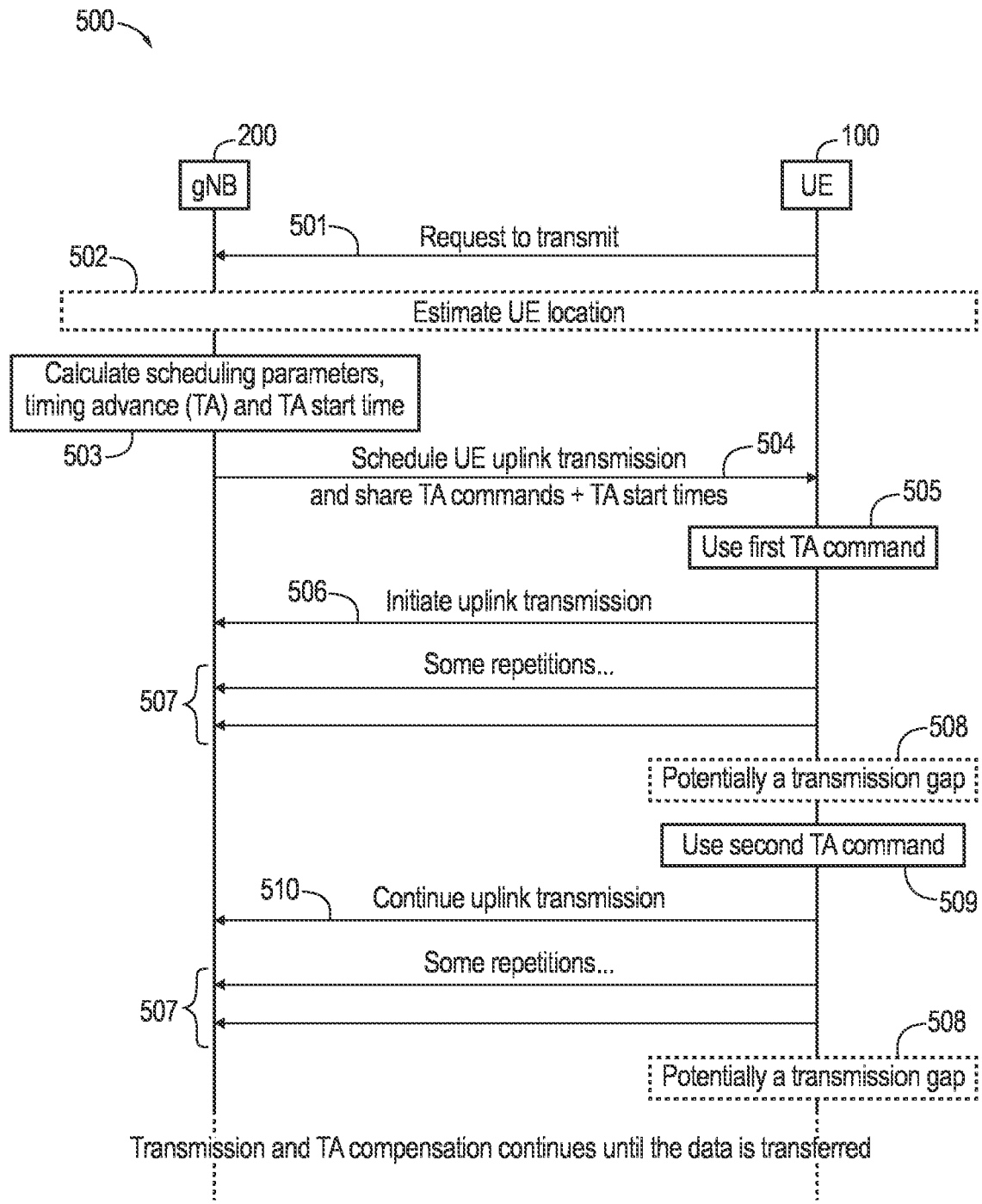
FIG. 5 shows an example embodiment of the subject matter described herein illustrating a signalling diagram.

FIG. 5 shows an example embodiment of the subject matter described herein illustrating a signalling diagram 500.

The client device 100 may transmit a request for uplink transmission 501 to the network node device 200. The client device 100 may transmit the request 501 in response to a payload data needing to be transmitted.

After receiving the request for uplink transmission 501, the network node device 200 may estimate 502 the location of the client device 100. The client device 100 may comprise, for example, global navigation satellite system (GNSS) capability. Thus, the location of the client device 100 may be known to the network node device 200. Alternatively, the network node device 200 may already comprise information about the location of the client device 100.

The network node device 200 may calculate 503 the TA commands and/or the corresponding validity times based on, for example, the relative location and/or relative motion of the client device 100 and of the network node device 200.

The network node device 200 may transmit a TA configuration message 504 to the client device 100. The TA configuration message 504 may comprise the plurality of TA commands and/or the corresponding indication of validity time. The network node device 200 may also schedule the uplink transmission. The network node device 200 may, for example, transit scheduling parameters to the client device 100. The scheduling parameters may comprise, for example, start time of the uplink transmission, resource allocated for the uplink transmission, and/or the number of transmission repetitions to be used for the uplink transmission.

The client device 100 may use 505 a first TA command from the plurality of TA commands and initiate the uplink transmission 506. The client device 100 may also perform repetition 507. There may be one or more transmission gaps 508 during the uplink transmission.

At some point in time, the client device 100 may use 509 a second TA command from the plurality of TA commands. The validity time of the second TA command may have been indicated by the network node device 200 in the TA configuration message 504 as disclosed above. The client device 100 may start to use the second TA command in response to reaching the validity time of the second TA command.

The client device 100 may continue 510 the uplink transmission while using the second TA command. The client device 100 may also perform further repetitions 507 while the client device 100 is using the second TA command. There may also be further transmission gaps 508 while the client device 100 is using the second TA command.

The client device 100 may continue the uplink transmission until the data has been transferred. The client device 100 may use any number of TA commands from the plurality of TA commands during the remaining transmission in a similar manner as disclosed above.

Figure 6:
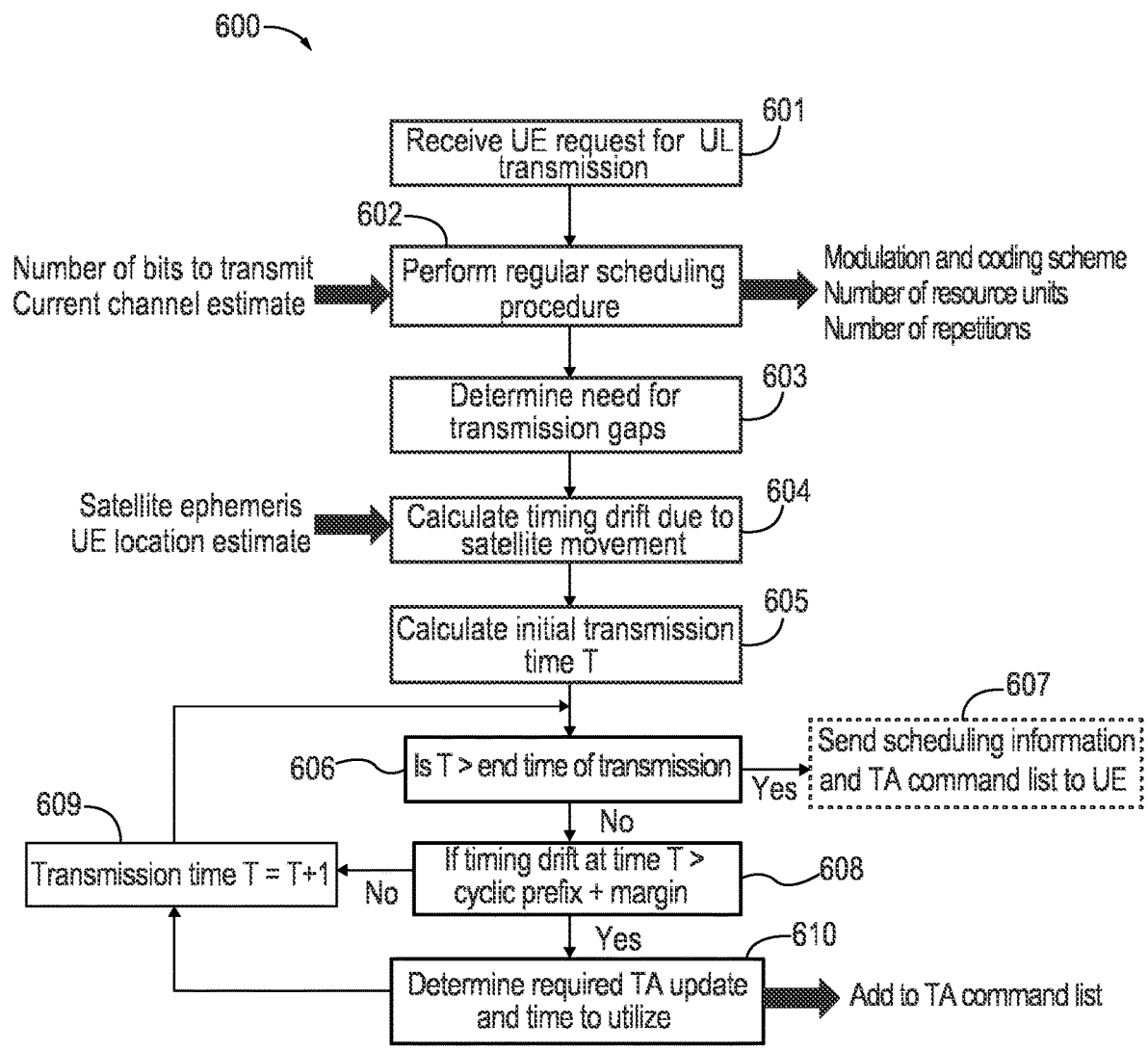
FIG. 6 shows an example embodiment of the subject matter described herein illustrating a flow chart.

FIG. 6 shows an example embodiment of the subject matter described herein illustrating a flow chart 600. The network node device 200 may utilise a procedure presented in the flowchart 600 to determine the plurality of TA commands for the client device 100.

The network node device 200 may receive 601 a request for uplink transmission from the client device 100. The network node device 200 may perform 602 a scheduling procedure for the request. The network node device 200 may receive in the request for uplink transmission, for example, the number of bits to be transmitted and/or the current channel estimate. The network node device 200 may determine a modulation and coding scheme to be used for the uplink transmission, number of resource units to be used for the uplink transmission, and/or the number of transmission repetitions to be used for the uplink transmission. Based on these, the network node device 200 may determine the expected uplink transmission time without transmission gaps.

The network node device 200 may further determine 603 the need for transmission gaps during the uplink transmission. Transmission gaps may be inserted, for example, after a preconfigured transmission length.

The network node device 200 may calculate 604 timing drift during the uplink transmission. The timing drift may be due to, for example, in the case of NTN, satellite motion during the uplink transmission. Alternatively or additionally, the timing drift may be due to other movement of the network node device 200 and/or of the client device 100. The network node device 200 may utilise, for example, satellite ephemeris and/or client device location for calculating 604 the timing drift.

The network node device 200 may calculate 605 an initial transmission time and save it to a time variable T. The network node device 200 may then compare 606 whether the time variable T is greater than the end time of the transmission. If the time variable T is greater than the end time of the transmission, the network node device 200 may transmit 607 the scheduling information and the plurality of TA commands to the client device 100. Otherwise, the network node device 200 may proceed to compare whether the timing drift at time T is greater than the cyclic prefix plus a margin. If the timing drift is not greater, the network node device 200 may increment 609 the time variable T forward in time and return to the comparison 606. If the timing drift is greater, the network node device 200 may proceed to determine 610 the required TA command update and/or a corresponding validity time. The network node device 200 may add the TA command and/or the time instant to the plurality of TA commands, proceed to increment the time variable T forward in time, and return to the comparison 606.

The network node device 200 may continue the procedure until, for example, the time variable T is greater than the end time of the transmission. Thus, when the procedure ends, the network node device 200 may have generated the plurality of TA commands and the corresponding validity times.

The time variable T or any other time quantity, such as the plurality of validity times, can be based on, for example, System Frame Number, a gap count, the repetition number, or UTC time.

At least some example embodiments disclosed herein may enable the client device 100 to adjust the TA during long, repeated uplink transmission. This may entail that the signal does not exceed the cyclic prefix and create interference.

At least some example embodiments disclosed herein may enable the client device 100 to only need to receive one plurality of TA commands prior to a long uplink transmission. The client device 100 may receive the plurality of TA commands in, for example, a single message.

At least some example embodiments disclosed herein may avoid the client device 100 needing to switch constantly between uplink and downlink (i.e. between uplink transmission and receiving during transmission gaps), thereby saving power.

At least some example embodiments disclosed herein may enable compensating for both the long propagation delay and the potentially many downlink repetitions used to receive the TA command before the actual uplink. Each TA command in the plurality of TA commands may be associated with a corresponding validity time. Thus, if the actual timing advance command is received significantly later than it was originally sent, this can be compensated for.

Figure 7:
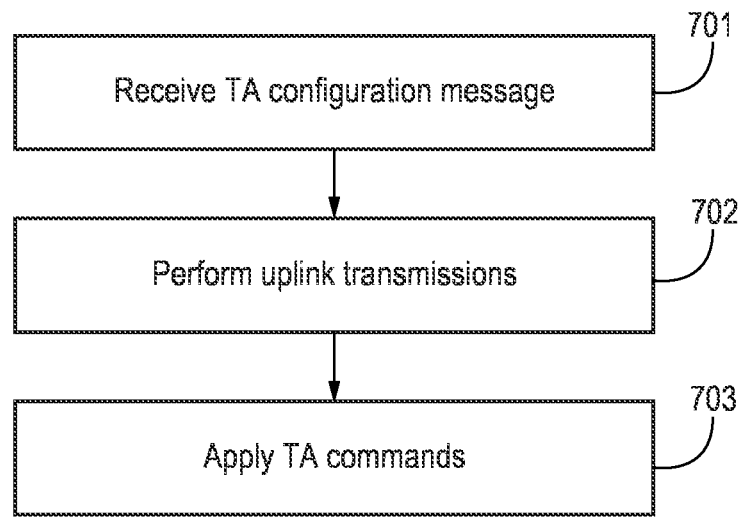
FIG. 7 shows an example embodiment of the subject matter described herein illustrating a flow chart of a method.

FIG. 7 shows an example embodiment of the subject matter described herein illustrating a flow chart of a method 700.

According to an example embodiment, the method 700 comprises receiving 701 a timing advance configuration message from a network node device, wherein the timing advance configuration message comprises a plurality of timing advance commands.

The method 700 may further comprise performing 702 a plurality of consecutive uplink transmissions to the network node device.

The method 700 may further comprise applying 703 the plurality of timing advance commands between the plurality of consecutive uplink transmissions.

Thus, the method 700 may alternate between performing an uplink transmission and applying a TA command.

According to an example embodiment, the timing advance configuration message further comprises an indication of validity times for the plurality of timing advance commands. The method 700 may further comprise applying the plurality of timing advance commands according to the indication of the validity times.

The indication of the validity times may comprise at least one of: a plurality of validity times corresponding to the plurality of timing advance commands or a periodicity value indicating a time periodicity for applying a new timing advance command from the plurality of timing advance commands.

The method 700 may further comprise, before receiving the timing advance configuration message, transmitting a request for the uplink transmissions to the network node device.

According to an example embodiment, the plurality of consecutive uplink transmissions corresponds to transmission repetitions.

According to an example embodiment, the uplink transmission is performed using narrowband physical uplink shared channel.

According to an example embodiment, the timing advance configuration message is received using narrowband physical downlink control channel.

According to an example embodiment, the method is performed by a client device, wherein the client device and the network node device are part of a non-terrestrial network.

According to an example embodiment, the method 700 is performed by an internet of things device or an enhanced machine-type communication device.

The method 700 may be performed by, for example, the client device 100.

Figure 8:
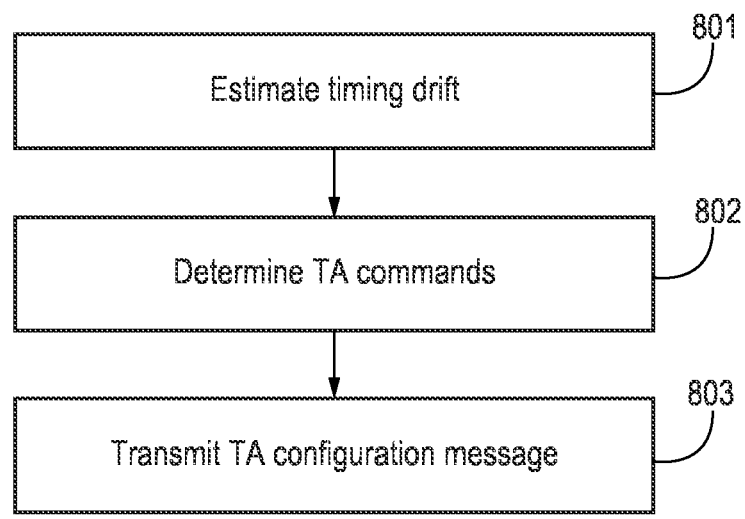
FIG. 8 shows an example embodiment of the subject matter described herein illustrating a flow chart of a method.

FIG. 8 shows an example embodiment of the subject matter described herein illustrating a flow chart of a method 800.

According to an example embodiment, the method 800 comprises estimating 801 a timing drift of a client device.

The method 800 may further comprise determining 802 a plurality of timing advance commands for a client device based on the estimated timing drift.

The method 800 may further comprise transmitting 803 a timing advance configuration message comprising the plurality of timing advance commands to the client device.

The method 800 may further comprise determining an indication of validity times based on the estimated timing drift, wherein the indication of validity times corresponds to the plurality of timing advance commands. The timing advance configuration message may further comprise the indication of validity times.

According to an example embodiment, the indication of the validity times comprises at least one of: a plurality of validity times corresponding to the plurality of timing advance commands or a periodicity value indicating a time periodicity for applying a new timing advance command from the plurality of timing advance commands.

According to an example embodiment, the determining the plurality of timing advance commands for the client device and/or the indication of validity times is performed in response to receiving a request for an uplink transmission from the client device.

According to an example embodiment, the method 800 further comprises determining scheduling parameters for the client device, determining an expected uplink transmission time based on the scheduling parameters, and determining the plurality of timing advance commands and/or the indication of the validity times based on the expected uplink transmission time.

According to an example embodiment, the plurality of timing advance commands and the indication of validity times are determined based at least on a relative location of a network node device and/or a satellite corresponding to the network node device and the client device and/or a relative motion of the network node device and/or a satellite corresponding to the network node device and the client device.

According to an example embodiment, the timing advance configuration message is transmitted using narrowband physical downlink control channel.

The method 800 may further comprise determining a number of transmission repetitions for the uplink transmissions and transmitting an indication of the number of transmission repetitions to the client device.

The method 800 may be performed by, for example, the network node device 200. The network node device 200 may be part of an NTN.

The functionality described herein can be performed, at least in part, by one or more computer program product components such as software components. According to an embodiment, the client device 100 and/or network node device 200 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A client device, comprising:
at least one processor; and
at least one memory including computer program code;
the at least one memory and the computer program code configured to, with the at least one processor, cause the client device to:
receive a timing advance configuration message from a network node device of a non-terrestrial network, wherein the timing advance configuration message comprises a plurality of timing advance commands;
perform a plurality of consecutive uplink transmissions to the network node device; and
apply the plurality of timing advance commands between the plurality of consecutive uplink transmissions, wherein the applying comprises at least transmitting a first set of one or more uplink transmissions using a first timing advance and consecutively in time domain transmitting a second set of one or more uplink transmissions using a second timing advance, wherein the first and second timing advances are based on the plurality of timing advance commands.

2. The client device according to claim 1, wherein the timing advance configuration message further comprises an indication of validity times for the plurality of timing advance commands, and wherein the at least one memory and the computer program code are further configured to, with the at least one processor, cause the client device to:
apply the plurality of timing advance commands according to the indication of the validity times.

3. The client device according to claim 2, wherein the indication of the validity times comprises at least one of:
a plurality of validity times corresponding to the plurality of timing advance commands; or
a periodicity value indicating a time periodicity for applying a new timing advance command from the plurality of timing advance commands.

4. The client device according to claim 1, wherein the at least one memory and the computer program code are further configured to, with the at least one processor, cause the client device to:
before receiving the timing advance configuration message, transmit a request for the uplink transmissions to the network node device.

5. The client device according to claim 1, wherein the plurality of consecutive uplink transmissions corresponds to transmission repetitions.

6. The client device according to claim 5, wherein the at least one memory and the computer program code are further configured to, with the at least one processor, cause the client device to:
receive from the network node device a number of transmission repetitions to be performed in the plurality of consecutive uplink transmissions.

7. The client device according to claim 5, wherein the plurality of consecutive uplink transmissions corresponds to transmission repetitions such that the first set of one or more uplink transmissions includes a plurality of repetitive uplink transmissions and the second set of one or more uplink transmissions includes a plurality of repetitive uplink transmissions.

8. The client device according to claim 1, wherein the at least one memory and the computer program code are further configured to, with the at least one processor, cause the client device to:
perform the uplink transmissions using narrowband physical uplink shared channel.

9. The client device according to claim 1, wherein the at least one memory and the computer program code are further configured to, with the at least one processor, cause the client device to:
receive the timing advance configuration message using narrowband physical downlink control channel.

10. The client device according to claim 1, wherein the client device and the network node device are part of the non-terrestrial network.

11. A method, comprising:
receiving a timing advance configuration message from a network node device of a non-terrestrial network, wherein the timing advance configuration message comprises a plurality of timing advance commands;
performing a plurality of consecutive uplink transmissions to the network node device; and
applying the plurality of timing advance commands between the plurality of consecutive uplink transmissions, wherein the applying comprises at least transmitting a first set of one or more uplink transmissions using a first timing advance consecutively in time domain transmitting a second set of one or more uplink transmissions using a second timing advance, wherein the first and second timing advances are based on the plurality of timing advance commands.

12. A computer program embodied on a non-transitory computer-readable medium, said computer program comprising program code configured to perform the method according to claim 11, when the computer program is executed on a computer.

* * * * *